(12) United States Patent
Homma et al.

(10) Patent No.: US 8,854,317 B2
(45) Date of Patent: *Oct. 7, 2014

(54) INFORMATION PROCESSING APPARATUS, INFORMATION PROCESSING METHOD AND PROGRAM FOR EXECUTING PROCESSING BASED ON DETECTED DRAG OPERATION

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 394 days.

This patent is subject to a terminal disclaimer.

(21) Appl. No.: 12/861,463

(22) Filed: Aug. 23, 2010

(65) Prior Publication Data
US 2011/0050608 A1 Mar. 3, 2011

(30) Foreign Application Priority Data

Sep. 2, 2009 (JP) ................................ P2009-202957

(51) Int. Cl.
*G06F 3/041* (2006.01)
*G09G 5/00* (2006.01)
*G06F 3/0488* (2013.01)

(52) U.S. Cl.
CPC .... *G06F 3/0414* (2013.01); *G06F 2203/04808* (2013.01); *G06F 3/0488* (2013.01)
USPC ............................ 345/173; 345/684; 345/676

(58) Field of Classification Search
CPC ....... G06F 3/041; G06F 3/0418; G06F 3/048; G06F 3/0486; G06F 3/0485; G06F 3/04855; G06F 3/04886; G06F 2203/04808
USPC .......................... 345/173–178, 156, 507, 660; 178/18.01–18.11; 382/187–189; 715/769–770, 863–864, 255, 702, 700, 715/716, 268; 340/407.2, 540; 361/679.08–679.55; 708/139, 140; 710/303; 463/37
See application file for complete search history.

(56) References Cited

U.S. PATENT DOCUMENTS

| 5,991,441 | A  | * | 11/1999 | Jourjine ......................... 382/187 |
| 6,590,568 | B1 | * | 7/2003  | Astala et al. ................... 345/173 |
| 8,184,093 | B2 | * | 5/2012  | Tsuiki ............................ 345/156 |
| 8,344,883 | B2 | * | 1/2013  | Ujii et al. ....................... 340/540 |
| 8,477,115 | B2 | * | 7/2013  | Rekimoto ...................... 345/174 |
| 8,508,487 | B2 | * | 8/2013  | Schwesig et al. ............. 345/173 |

(Continued)

FOREIGN PATENT DOCUMENTS

JP 2008-84119 4/2008

*Primary Examiner* — Dwayne Bost
*Assistant Examiner* — Darlene M Ritchie
(74) *Attorney, Agent, or Firm* — Sherr & Jiang, PLLC

(57) ABSTRACT

There is provided an information processing apparatus including a display section capable of displaying information on its display surface, a touch panel capable of detecting a position in the display surface where an operation tool has contacted with as a contact position, a pressure value detection section detecting a pressure value which is a size of a pressure applied to the contact surface by a contact between the operation tool and the contact surface, a process control section specifying a first processing or a second processing as a processing subject to be executed in accordance with a change of the detected pressure value, a first processing section executing the first processing when the first processing is specified to be a processing subject to be executed, and a second processing section executing the second processing when the second processing is specified to be a processing subject to be executed.

14 Claims, 11 Drawing Sheets

(56) References Cited

U.S. PATENT DOCUMENTS

| | | | |
|---|---|---|---|
| 2002/0015064 A1* | 2/2002 | Robotham et al. | 345/863 |
| 2005/0188306 A1* | 8/2005 | Mackenzie | 715/530 |
| 2005/0259087 A1* | 11/2005 | Hoshino et al. | 345/173 |
| 2006/0007174 A1* | 1/2006 | Shen | 345/173 |
| 2006/0197753 A1* | 9/2006 | Hotelling | 345/173 |
| 2008/0024459 A1* | 1/2008 | Poupyrev et al. | 345/173 |
| 2008/0094367 A1* | 4/2008 | Van De Ven et al. | 345/173 |
| 2008/0165141 A1* | 7/2008 | Christie | 345/173 |
| 2008/0297484 A1* | 12/2008 | Park et al. | 345/173 |
| 2009/0046110 A1* | 2/2009 | Sadler et al. | 345/660 |
| 2009/0058830 A1* | 3/2009 | Herz et al. | 345/173 |
| 2009/0273571 A1* | 11/2009 | Bowens | 345/173 |
| 2009/0295753 A1* | 12/2009 | King et al. | 345/174 |
| 2010/0005390 A1* | 1/2010 | Bong | 715/702 |
| 2010/0017710 A1* | 1/2010 | Kim et al. | 715/702 |
| 2010/0095205 A1* | 4/2010 | Kinoshita | 715/702 |
| 2010/0156814 A1* | 6/2010 | Weber et al. | 345/173 |
| 2010/0225604 A1* | 9/2010 | Homma et al. | 345/173 |
| 2011/0018695 A1* | 1/2011 | Bells et al. | 340/407.2 |
| 2011/0258537 A1* | 10/2011 | Rives et al. | 715/255 |
| 2011/0283212 A1* | 11/2011 | Warner | 715/769 |

* cited by examiner

DRAG WITHOUT TOUCH

WHEN DRAGGING WITHOUT TOUCH (STOP FINGER),
PRESSURE VALUE ON TOUCH PANEL WILL BE ALMOST STEADY

COORDINATE CHANGE

PRESSURE VALUE CHANGE

TOUCH & DRAG

WHEN DRAGGING AFTER TOUCHING, TEMPORARY WEAK
CHANGE OCCURS IN PRESSURE TO TOUCH PANEL

COORDINATE CHANGE

PRESSURE VALUE CHANGE

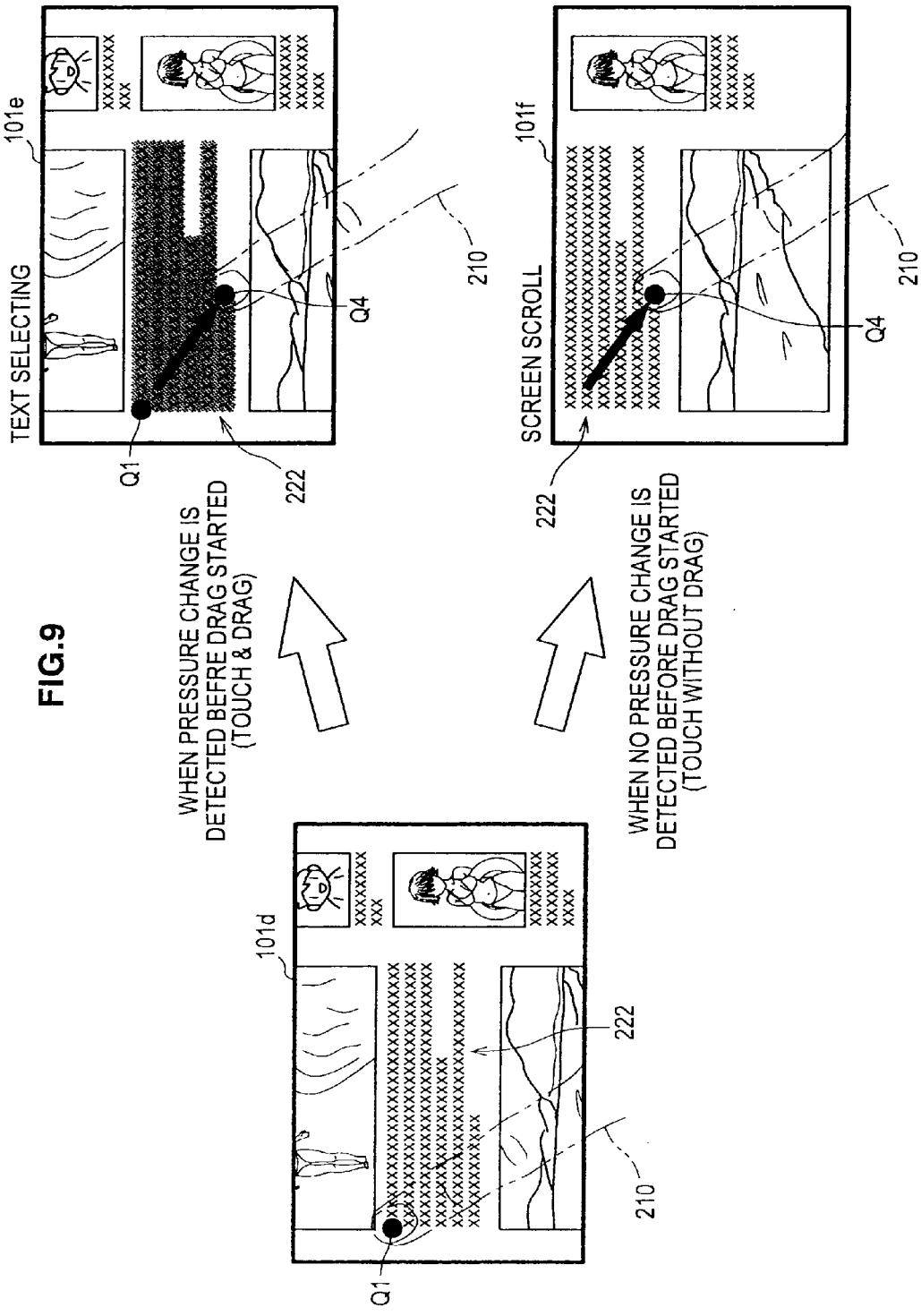

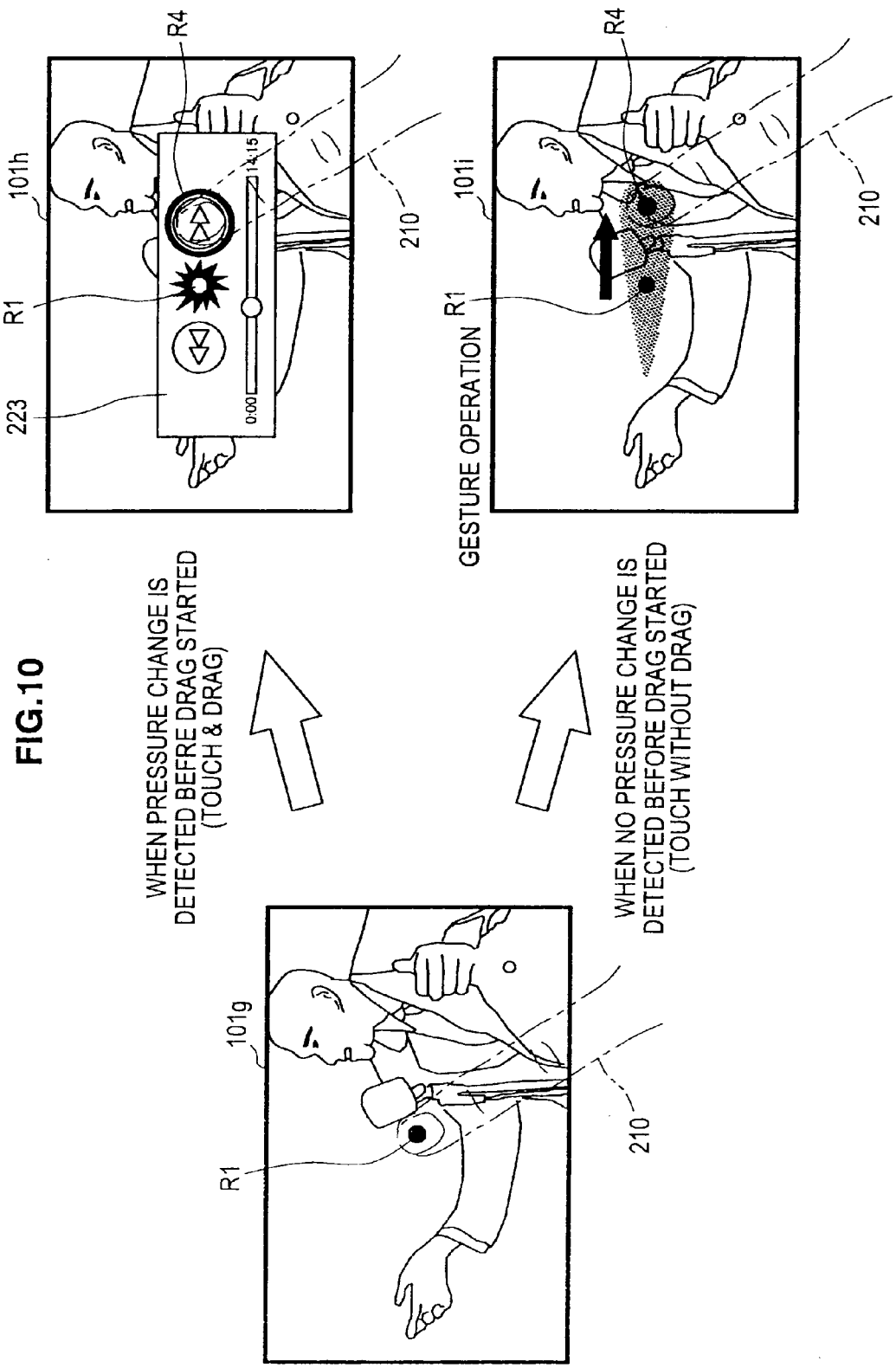

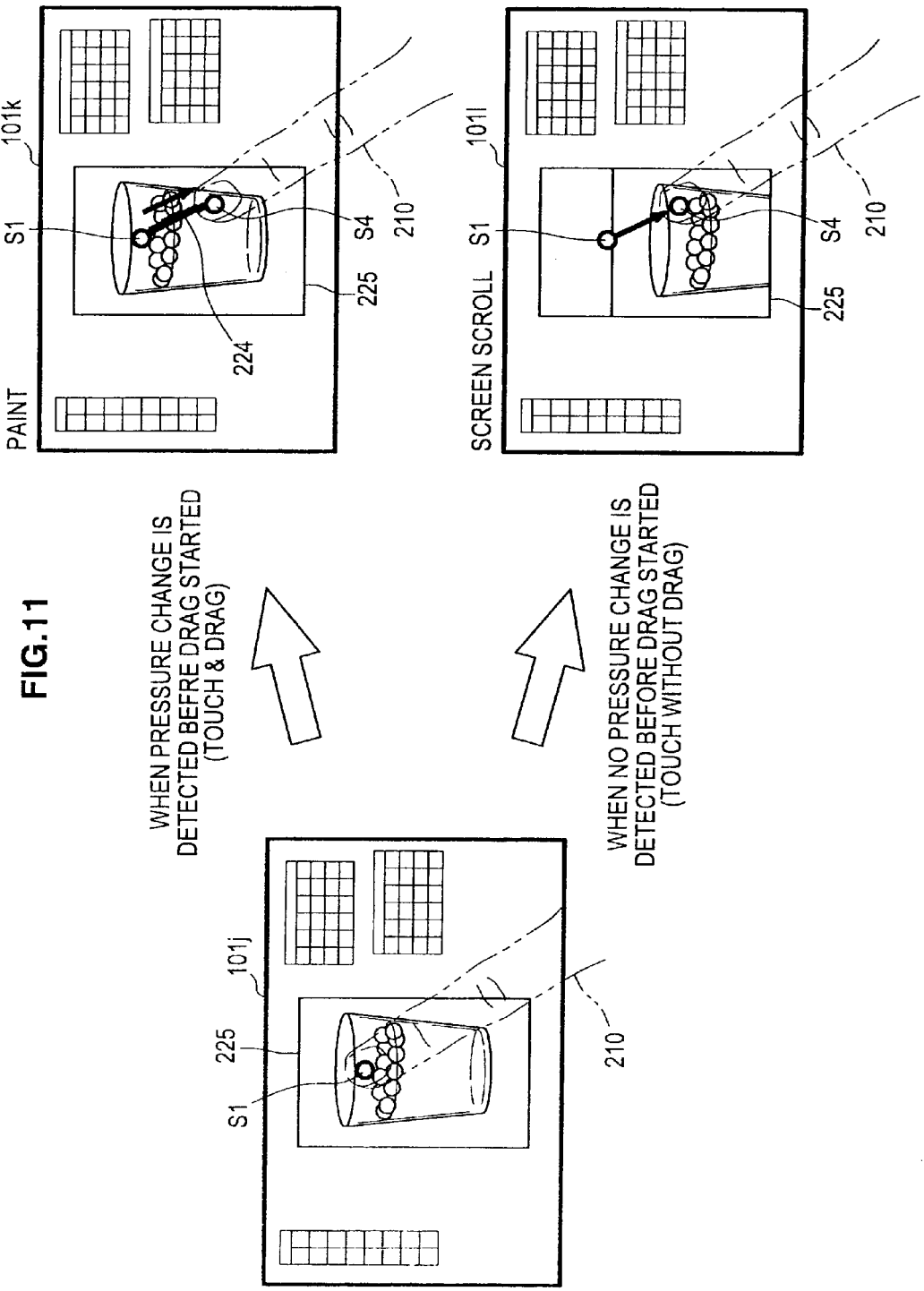

INFORMATION PROCESSING APPARATUS, INFORMATION PROCESSING METHOD AND PROGRAM FOR EXECUTING PROCESSING BASED ON DETECTED DRAG OPERATION

BACKGROUND OF THE INVENTION

1. Field of the Invention

The present invention relates to an information processing apparatus, an information processing method and program.

2. Description of the Related Art

In recent years, a device having a function of UI (User Interface) using a touch panel has become widespread. Scrolling a screen by a scroll bar used to be an ordinary way on the UI of a personal computer, however, by the spread of the UI using the touch panel, it becomes possible to scroll a screen only by dragging on a screen with an operation tool such as a finger.

However, the UI using a touch panel still has a problem, for example, that an operation of selecting texts or images by dragging and an operation of scrolling a screen by dragging may interrupt each other. In order to clear this problem, there is an idea to teach the device a new gesture for selecting texts, however, this may be a cause to decrease an operability.

Moreover, there is a case where objects, which are movable by dragging when being selected by a touch operation of an operation tool, are arranged over the entire screen which can be scrolled by dragging. In such a case, it cannot distinguish between the operation of scrolling a screen and the operation of moving the objects.

Further, to draw by dragging with a pen on a canvas which can be scrolled by dragging, there is a problem that the operation of scrolling and the operation of drawing may be overlapped.

In order to deal with such a problem, there has been a technology disclosed, for example, in which by detecting an area of a touch panel which an operation tool contacts with and distinguishing a pen and a finger based on the detected area, different operations are assigned to the operation by the pen and the operation by the finger respectively (for example, refer to JP2008-84119A).

SUMMARY OF THE INVENTION

In the technology which is disclosed in JP2008-84119A, however, it is difficult to distinguish a plurality of operations when only fingers is used as an operation tool to operate, so there has been a problem that it is difficult to assign different operations to each of a plurality of operations.

In light of the foregoing, it is desirable to provide a novel and improved technology capable of clearly distinguishing between a plurality of operations to a touch panel by an operation tool.

According to an embodiment of the present invention, there is provided an information processing apparatus which includes a display section that has a display surface and is capable of displaying information on the display surface, a touch panel that has a contact surface and is capable of detecting a position in the display surface where an operation tool has contacted with as a contact position, a pressure value detection section that detects a pressure value which is a size of a pressure applied to the contact surface by a contact between the operation tool and the contact surface, a process control section that specifies a first processing or a second processing as a processing subject to be executed in accordance with a change of the pressure value detected by the pressure value detection section, a first processing section that executes the first processing when the process control section specifies the first processing as a processing subject to be executed, and a second processing section that executes the second processing when the process control section specifies the second processing as a processing subject to be executed.

The information processing apparatus may further include a pressure value monitor section that monitors the pressure value detected by the pressure value detection section in conjunction with an elapsed time, and a drag detection section that detects a drag that is an operation in which the operation tool moves while contacting with the contact surface. The process control section may specify the first processing or the second processing as a processing subject to be executed according to an amount of change of the pressure value within a predetermined period of time monitored by the pressure value monitor section when the drag detection section detects the drag.

The drag detection section may further detect a time when the drag has been started as a drag start time. The process control section may use a ratio of the pressure value at the drag start time to the pressure value at a time the predetermine period of time earlier than the drag start time detected by the drag detection section as the amount of change within the predetermined period of time.

The process control section may specify the first processing as a processing subject to be executed when a condition that its ratio is equal to or less than a predetermined value is met, and may specify the second processing as a processing subject to be executed when the condition is not met.

The information processing apparatus may further include a contact start detection section that detects a position where the operation tool starts contacting with the contact surface as a contact start position. The first processing section may execute a processing using the contact start position detected by the contact start detection section as the first processing.

The drag detection section may further detect a distance and a direction which the operation tool moves while contacting the contact surface by the drag. The first processing section may execute a processing to move an object displayed at a position corresponding to the contact start position detected by the contact start detection section, among information displayed on the display surface, based on the direction and the distance that are detected by the drag detection section as the first processing.

The second processing section may execute a processing of scrolling a screen displayed in the display surface, among information displayed in the display surface, based on the distance and the direction which are detected by the drag detection section as the second processing.

The first processing section may execute a processing of selecting information existing in an area to be specified based on the contact start position, and a position which is moved from the contact start position based on the direction and the distance that are detected by the drag detection section, among information displayed on the display surface, as the first processing.

The first processing section may execute a processing of displaying a window, in which a button for specifying a command by the operation tool is arranged, at the contact start position of the display surface as the first processing.

The first processing section may execute a processing following the command specified by the selected button when determined that the operation tool has selected the button arranged in the window.

The second processing section may fast-forward or fast-rewind a video image to be displayed in the display surface based on the direction and the distance that are detected by the drag detection section.

When a contact start position is to be a start point, and when a position moved from the contact start position based on the direction and the distance that are detected by the drag detection section is to be a end point, the first processing section may execute a processing to draw a line at a position in the display surface corresponding to from the start point to the end point as the first processing.

According to the present invention described above, it can be possible to distinguish a plurality of operations to a touch panel by an operation tool.

BRIEF DESCRIPTION OF THE DRAWINGS

FIG. 9 is an explanatory view illustrating operations in the information processing apparatus according to a first modification of the present embodiment;

FIG. 10 is an explanatory view illustrating operations in the information processing apparatus according to a second modification of the present embodiment; and FIG. 11 is an explanatory view illustrating operations in the information processing apparatus according to a third modification of the present embodiment.

DETAILED DESCRIPTION OF THE EMBODIMENT(S)

Figure 1:
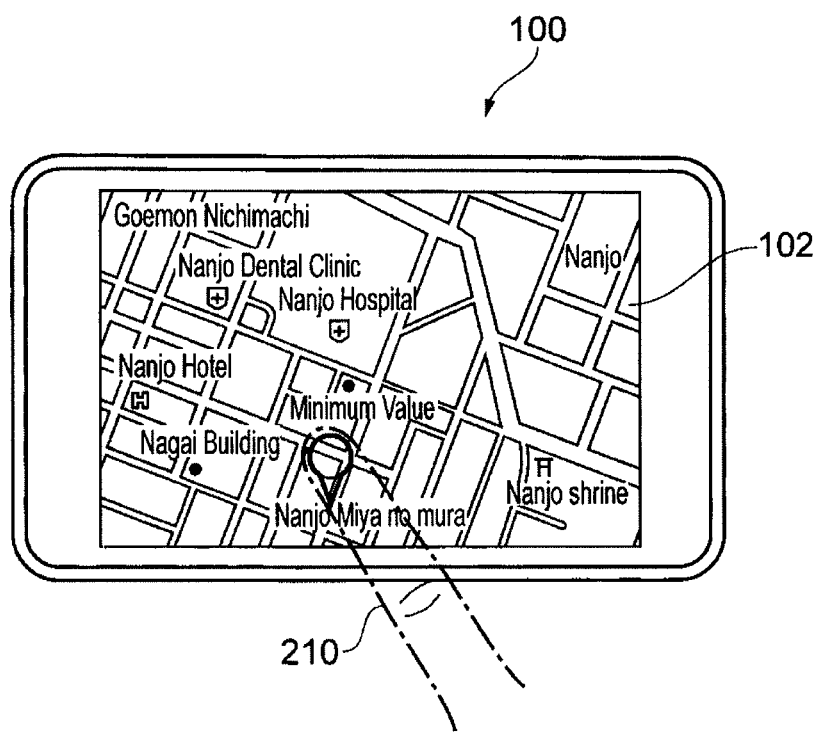
FIG. 1 is an explanatory view illustrating how an information processing apparatus according to a first embodiment of the present invention is operated.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be given in the following order.
1. A first embodiment of the present invention
    1-1. A view on how an information processing apparatus is operated
    1-2. An exploded perspective view of an information processing apparatus
    1-3. A hardware configuration of an information processing apparatus
    1-4. A pressure value change when dragging without a touch is performed
    1-5. A pressure value change when dragging with a touch is performed
    1-6. How an information processing apparatus operates
    1-7. A functional configuration of an information processing apparatus
    1-8. A flow of operations of an information processing apparatus
2. Modification of the first embodiment of the present invention
    2-1. A first modification
    2-2. A second modification
    2-3. A third modification
3. Summary 1. A First Embodiment of the Present Invention
1-1. How an Information Processing Apparatus is Operated FIG. 1 is an explanatory view illustrating how an information processing apparatus according to a first embodiment of the present invention is operated. How an information processing apparatus according to a first embodiment of the present invention is operated will be explained with reference to FIG. 1.

An information processing apparatus 100 according to the first embodiment of the present invention includes a touch panel 102. A user can perform an operation by contacting the touch panel 102 with an operation tool 210. In the following explanation, it is assumed that a right index finger of the user is used as the operation tool 210, however, the user does not need to limit the particular finger, but may use any other finger easy to use. For example, the user may use any left finger, other than index finger, such as thumb, middle finger, ring finger or pinky finger.

1-2 An Exploded Perspective View of the Information Processing Apparatus

Figure 2:
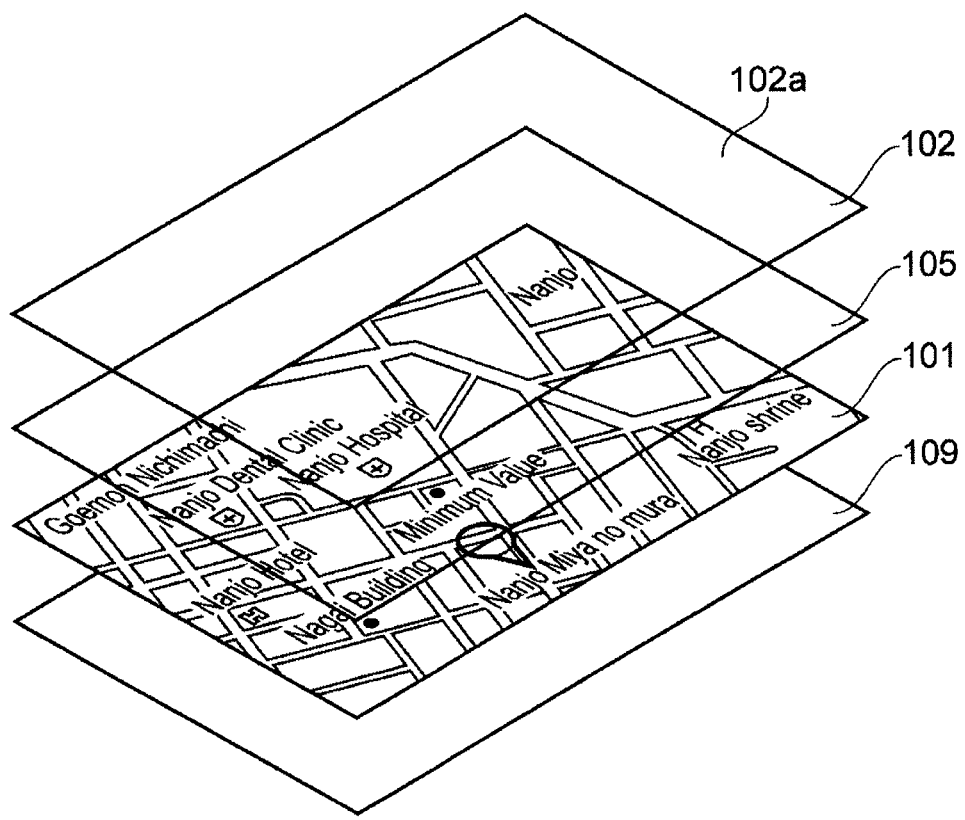
FIG. 2 is an exploded perspective view illustrating the information processing apparatus according to the first embodiment.

FIG. 2 is an exploded perspective view illustrating the information processing apparatus according to the first embodiment of the present invention. A hardware configuration of the information processing apparatus according to the first embodiment of the present invention will be explained with reference to FIG. 2. In FIG. 2, an example is illustrating that the touch panel 102, a pressure sensor (a pressure sensitive sensor) 105, a display device 101 and a substrate 109 are built up in the order described from the upper surface to the bottom surface of the information processing apparatus 100. However, the order of building up is not necessarily limited to this example.

As shown in FIG. 2, the touch panel 102 is arranged on the upper surface of the information processing apparatus 100. Having a contact surface 102a which the operation tool 210 of the user can contact with the touch panel 102 can obtain a position information indicating a position in contact with the operation tool 210 on the contact surface 102a. The touch panel 102 outputs the obtained position information to a CPU 108 (refer to FIG. 3) as an information signal. The user of the information processing apparatus 100 can input various data or instruct processing operations to the information processing apparatus 100 by bringing the operation tool 210 in contact with the touch panel 102. As for the touch panel 102, any sort of panel can be used if it can detects the position on the contact surface 102a where the operation tool 210 contact with.

On the bottom surface of the touch panel 102, the pressure sensor 105 is arranged. The pressure sensor 105 may be arranged, as shown in FIG. 2, over the entire surface of the bottom surface of the touch panel 102, or may be arranged on a predetermined places (such as four corners, etc.), however, the position where the pressure sensor 105 is arranged is not specifically limited. The pressure sensor 105 may be arranged on a position where pressure received by the contact surface 102a from the operation tool 210 can be detected when the user presses the touch panel 102 using the operation tool 210.

The display device 101 is placed on the bottom surface of the pressure sensor 105. The display device 101 is enabled to display information. The display device 101 is configured from, for example, an apparatus capable of visually notifying the user of information such as an LCD (Liquid Crystal Display) and organic EL (Electroluminescence) display device. The display device 101 outputs, for example, results obtained by various kinds of processing performed by the information processing apparatus 100. More specifically, the display device 101 displays the results obtained by various kinds of processing performed by the information processing apparatus 100 in the form of text or image. Moreover, in the present embodiment, the display device 101 is to be arranged on the bottom surface of the pressure sensor 105, however, the position to be arranged is not specifically limited. For example, the display device 101 may exist outside of the information processing apparatus 100.

The substrate 109 is arranged on the bottom surface of the display device 101. Various components or devices used by the information processing apparatus 100 are mounted on the substrate 109. More specifically, devices such as a non-volatile memory 106, a RAM (Random Access Memory) 107, the CPU (Central Processing Unit) 108 and the like later-described using FIG. 4 later are mounted.

1-3. Hardware Configuration of Information Processing Apparatus

Figure 3:
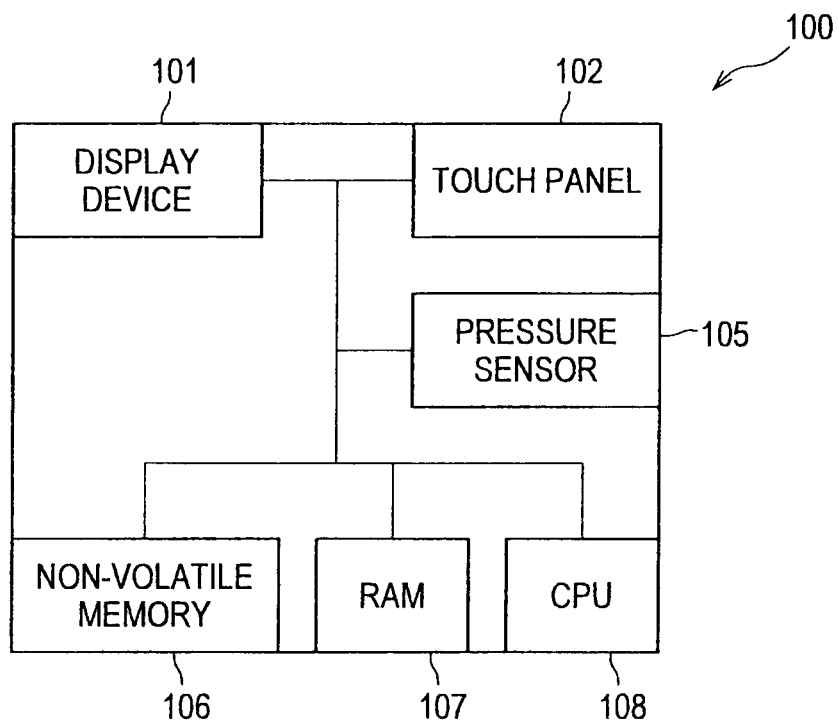
FIG. 3 is an explanatory view illustrating a hardware configuration of the information processing apparatus according to the first embodiment.

FIG. 3 is an explanatory view illustrating a hardware configuration of the information processing apparatus according to the first embodiment of the present invention. The hardware configuration of the information processing apparatus according to the first embodiment of the present invention will be explained with reference to FIG. 3.

As shown in FIG. 3, the information processing apparatus 100 is configured from the display device 101, the touch panel 102, the pressure sensor 105, the non-volatile memory 106, the RAM 107 and the CPU 108. However, as described above, the display device 101 may exist outside of the information processing apparatus 100. Here, the non-volatile memory 106, the RAM 107 and the CPU 108 will be explained.

The non-volatile memory 106 is a data storage apparatus and is configured from, for example, a magnetic storage device such as an HDD (Hard Disk Drive), semiconductor storage device, optical storage device, or magneto-optical storage device. The non-volatile memory 106 stores programs executed by the CPU 108 and various kinds of data.

The RAM 107 temporarily stores programs used by the CPU 108 and parameters that appropriately change during execution thereof.

The CPU 108 functions as an arithmetic processing unit and a control apparatus and controls the overall operation inside the information processing apparatus 100 or a portion thereof according to various programs recorded in the non-volatile memory 106 or the RAM 107.

In the foregoing, an example of the hardware configuration that can realize the function of the information processing apparatus 100 according to the embodiment of the present invention has been shown. Each of the above components may be configured using general-purpose members or hardware specialized for the function of each component. Therefore, the hardware configuration to be used can be changed appropriately in accordance with the technical level each time when the present embodiment is carried out.

1-4. A Pressure Value Change when Dragging without a Touch is Performed

Figure 4:
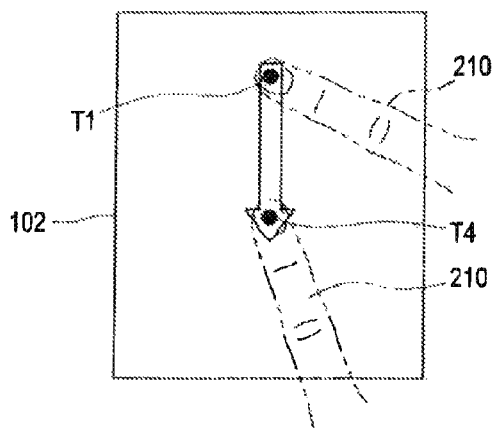
FIG. 4 is an explanatory view illustrating a pressure value change when dragging without a touch is performed.
Figure 4:
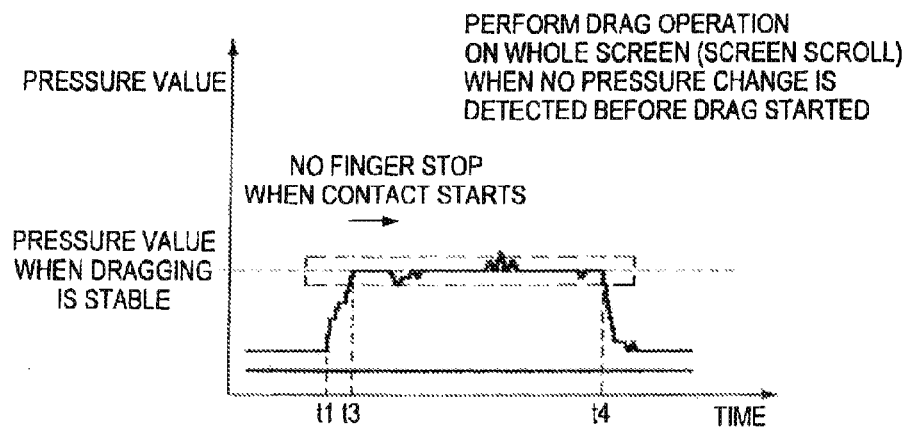

FIG. 4 is an explanatory view illustrating a pressure value change when dragging without a touch is performed. The pressure value change when dragging without a touch is performed will be explained with reference to FIG. 4.

As shown in FIG. 4, a case is assumed where the operation tool 210 drags on the touch panel 102 without a touch (stop a finger) from a contact start position T1 to a contact end position T4 (hereinafter referred to as "a drag without a touch"). In this case, a pressure value that is a size of the pressure applied to the touch panel 102 (hereinafter referred to as simply "the pressure value") is almost stable, and the way the pressure value is changing over time is like the graph shown in FIG. 4.

More specifically, the pressure value is going up relatively moderately from time t1 when the operation tool 210 starts to contact with the touch panel 102 until time t3 when the operation tool 210 starts to move on the touch panel 102. Thus, when a (rapid) change in the pressure is not detected before time t3, the information processing apparatus 100 can execute a second processing. As the second processing, a processing to scroll over the entire screen displayed on the display section 150 is assumed, for example.

1-5. A Pressure Value Change when Dragging with a Touch is Performed

Figure 5:
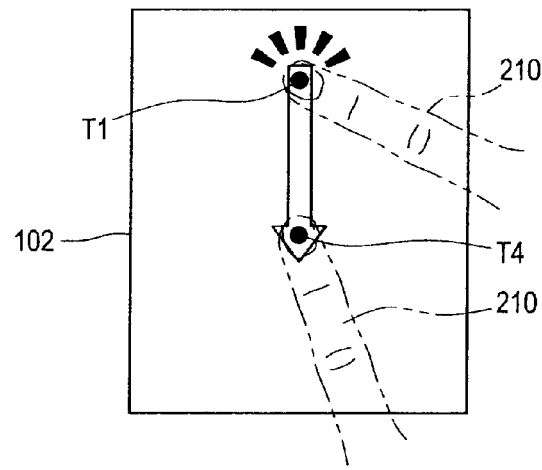
FIG. 5 is an explanatory view illustrating a pressure value change when dragging with a touch is performed.
Figure 5:
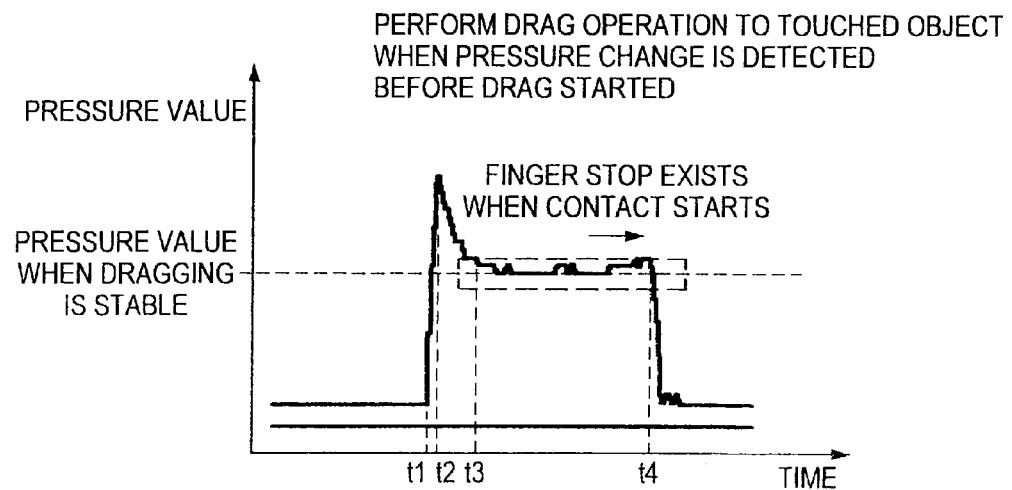

FIG. 5 is an explanatory view illustrating a pressure value change when dragging with a touch is performed. The pressure value change when dragging with a touch is performed will be explained with reference to FIG. 5.

As shown in FIG. 5, a case is assumed where the operation tool 210 drags on the touch panel 102 after touching the touch panel 102 from a contact start position T1 to a contact end position T4 (hereinafter referred to as "a touch and drag"). In this case, the way how the pressure value is changing over time is like a graph shown in FIG. 5. When the operation tool 210 drags on the touch panel 102 after touching, the pressure value right after the touch shows an overshoot which deviates far from the pressure value when the drag is stable.

More specifically, there is time t2 where the overshoot is found in the pressure value during from time t1 when the operation tool 210 starts to contact with the touch panel 102 until time t3 when the operation tool 210 starts to move on the touch panel 102. For example, the time from time t2 to t3 is assumed to be 20 ms on an empirical basis, however, this will be changed according to users' individual differences or environmental factors. Thus, when a (rapid) change in the pressure is detected before time t3, the information processing apparatus 100 can execute the first processing. As the first processing, a processing to move an object which the operation tool 210 touches on a screen displayed on the display section 150, or the like is assumed.

1-6. How an Information Processing Apparatus Operates

Figure 6:
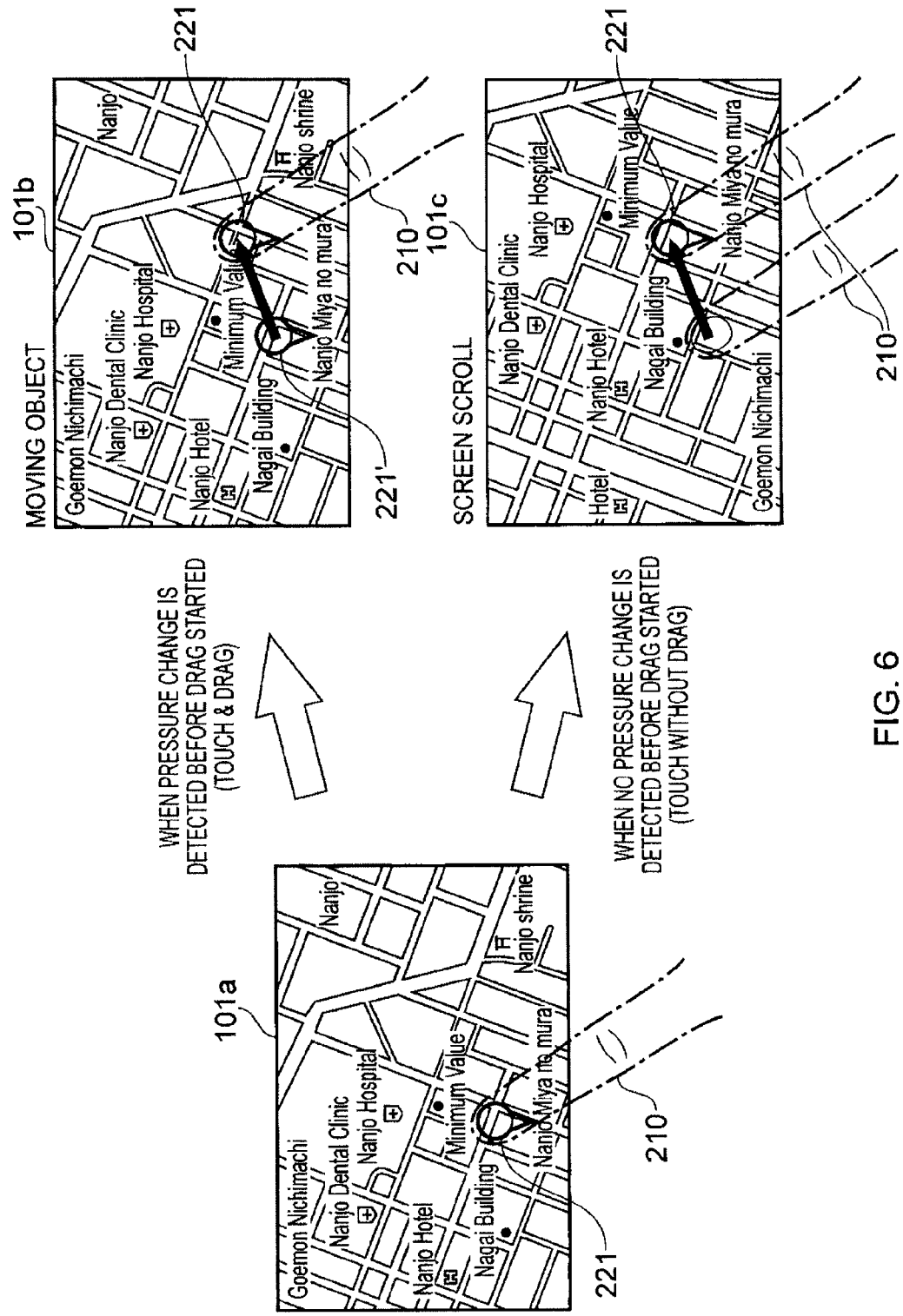
FIG. 6 is an explanatory view illustrating operations in the information processing apparatus according to a first embodiment.

FIG. 6 is an explanatory view illustrating operations in the information processing apparatus according to a first embodiment of the present invention. The operations in the information processing apparatus according to a first embodiment of the present invention will be explained with reference to FIG. 6.

As shown in FIG. 6, a case is assumed where the information processing apparatus 100 starts a map viewer, and displays a map on the display surface 101a of the display device 101. Further, as an example of the object, a pin 221 linked to a GPS information is displayed on the display surface 101a. According to the information processing apparatus 100 of the present embodiment, for example, it is possible to distinguish an operation to scroll the map and an operation to move the pin 211.

More specifically, when the operation tool 210 drags the touch panel 102 after touching, the information processing apparatus 100 executes a processing to move an object which exists at a position that has been touched. The display surface 101*b* shows how a pin 221', an example of an object before being moved by the information processing apparatus 100, is moved to the pin 221, that is an example of an object after being moved.

On the other hand, scrolling a map displayed on the display device 101 can be performed by a drag operation of the operation tool 210. Here, there is a difference between an operation to move an object and an operation to scroll the entire screen. In the former case, the information processing apparatus 100 needs to detect a position touched by the operation tool 210, while in the latter case, the information processing apparatus 100 does not need to detect the position touched by the operation tool 210 because obtaining the relative amount of moving is enough. The present embodiment uses this difference to distinguish an interaction due to dragging.

More specifically, when the operation tool 210 drags the touch panel 102 without touching, the information processing apparatus 100 executes a processing to scroll the screen. On the display surface 101*c* shows a screen after being scrolled by the information processing apparatus 100.

1-7. A Functional Configuration of an Information Processing Apparatus

Figure 7:
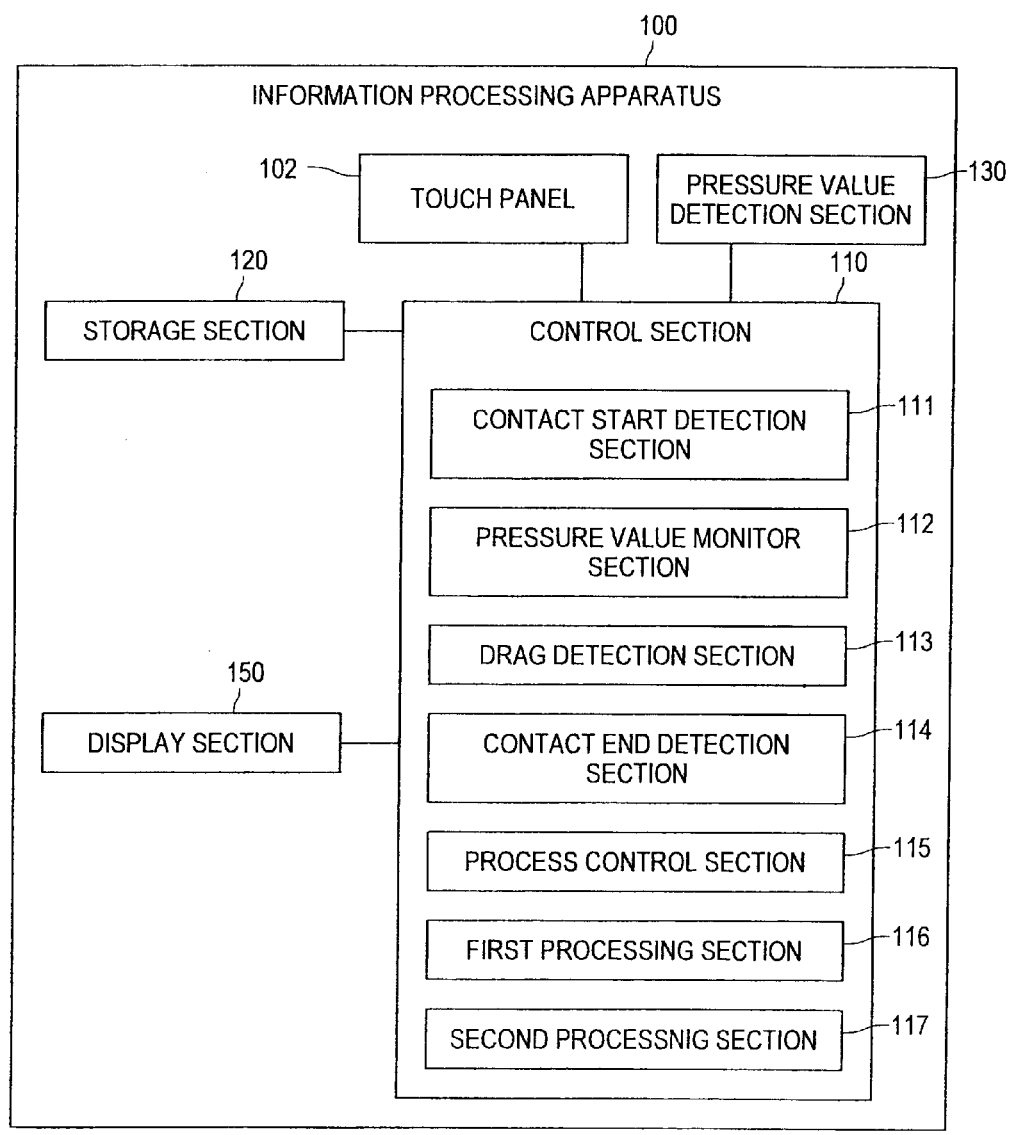
FIG. 7 is an explanatory view illustrating a functional configuration of the information processing apparatus according to the first embodiment.

FIG. 7 is an explanatory view illustrating a functional configuration of the information processing apparatus according to the first embodiment. The functional configuration of the information processing apparatus according to the first embodiment will be explained with reference to FIG. 7.

As shown in FIG. 7, the information processing apparatus 100 includes a control section 110, a storage section 120, a pressure value detection section 130, the touch panel 102 and a display section 150.

The storage section 120 is configured of, for example, the non-volatile memory 106 or the like, and includes functions to store data or the like used when a program or the control section 110 executes processing.

The display section 150 is configured of, for example, the display device 101 or the like, includes a display surface, and is able to display information on the display surface. Information to be displayed in the display surface is output from, for example, a first processing section 116 or a second processing section 117. Moreover, as described above, the display section 150 may exists outside of the information processing apparatus 100.

The touch panel 102 is configured of, for example, a capacitive touch panel or the like, includes the contact surface 102*a* and is able to detect a position in the contact surface 102*a* contacted by the operation tool 210 as a contact position. As described above, the touch panel 102 is not limited to the capacitive touch panel.

The pressure value detection section 130 is configured of, for example, the pressure sensor 105 or the like, and detects the pressure value that is a size of pressure applied to the contact surface 102*a* by the operation tool 210. Note that pressure value detection section 130 can detect, indirectly, the pressure value that is a size of pressure applied to the pressure value detection section 130. Therefore, the pressure value detection section 130 detects indirectly the pressure value that is the size of the pressure applied to the contact surface 102*a* by detecting the pressure value that is the size of pressure applied to the pressure value detection section 130 through the contact surface 102*a* by the operation tool 210.

The control section 110 is configured from, for example, the CPU 108, the RAM 107 or the like, and includes a process control section 115, the first processing section 116, the second processing section 117 or the like. Functions included in the control section 110 can be realized, for example, by the CPU 108 which develops a program stored in the storage section 120 into the RAM 107 and executes the program developed into the RAM 107.

The process control 115 specifies the first processing and the second processing as the processing subject to be executed according to the pressure value change detected by the pressure value detection section 130. Various methods can be assumed as the method of specifying, and it is not to be specifically limited. When the process control section 115 specifies the first processing as a processing subject to be executed, the process control section 115 outputs the specified result to the first processing section 116, and when specifies the second processing as a processing subject to be executed, the process control section 115 outputs the specified result to the second processing section 117.

The first processing section 116 executes the first processing when the process control section 115 specifies the first processing as a processing subject to be executed. The first processing section 116 determines that the process control section 115 specified the first processing as a processing subject to be executed when received an input indicating that the first processing is specified to be a processing subject to be executed from the process control section 115. The first processing is not to be specifically limited, but in the above example, corresponds to a processing to move an object, or the like.

The second processing section 117 executes the second processing when the process control section 115 specifies the second processing as a processing subject to be executed. The second processing section 117 determines that the process control section 115 specified the second processing as a processing subject to be executed when received an input indicating that the second processing is specified to be an processing subject to be executed from the process control section 115. The second processing is not to be specifically limited, but in the above example, corresponds to a processing to scroll a screen, or the like.

The control section 110 may further include a pressure value monitor section 112 and a drag detection section 113. The pressure value monitor section 112 monitors the pressure value detected by the pressure value detection section 130 in conjunction with an elapsed time. The pressure value monitor section 112 retains the monitored pressure value correlating to the elapsed time. The reference time for the elapsed time is not to be specifically limited, and may be based on the time right after when the power of the information processing apparatus 100 turned on, or may be the time when the CPU 108 started the program. The drag detection section 113 detects a drag that is an operation in which the operation tool 210 moves while contacting the contact surface 102*a*.

The process control section 115 specifies the first processing or the second processing as a processing subject to be executed according to the amount of change of the pressure value within a predetermined period of time monitored by the pressure value monitor section 112 when the drag detection section 113 detects a drag. The predetermined period of time is not to be specifically limited, and within the predetermined period of time is not to be specifically limited as far as it is in the range of the predetermined period of time.

The drag detection section 113 may further detects a time when a drag started as a drag start time. In that case, the process control section 115 may use the ratio of the pressure value at the drag start time to the pressure value at a time the predetermine period of time earlier than the drag start time detected by the drag detection section 113 as the amount of change within the predetermined period of time. In an example shown in FIG. 5, the drag start time corresponds to time t3, and the time the predetermined period of time (for example, 20 ms) earlier than the drag start time corresponds to time t2.

The process control section 115 may specify the first processing as a processing subject to be executed when a condition that its ratio is equal to or less than a predetermined value is met, and may specify the second processing as a processing subject to be executed when the condition is not met. The predetermine value is not to be specifically limited, but in the example shown in FIG. 5, the predetermined value corresponds to 70 percent.

The control section 110 may further include the contact start detection section 111. In this case, the contact start detection section 111 detects a position where the operation tool 210 starts a contact with the contact surface 102a as a contact start position. The first processing section 116 executes a processing using the contact start position detected by the contact start detection section 111 as the first processing. The processing using the contact start position is not to be specifically limited, but in the above example, it corresponds to a processing to move an object that exists in the contact start position.

The drag detection section 113 may further detect a distance and a direction which the operation tool 210 moves by dragging while contacting the contact surface 102a. In that case, the first processing section 116 executes a processing to move an object displayed at a position corresponding to the contact start position detected by the contact start detection section 111, among information displayed on the display surface, as the first processing based on the direction and the distance that are detected by the drag detection section 113.

The control section 110 can obtain a correspondence relation between a position on the contact surface 102a and a position on the display surface. The correspondence relation between the position on the contact surface 102a and a position on the display surface may be one to one, or may be one to n. For example, when the display surface is larger than the contact surface 102a, n is to be larger than 1.

The second processing section 117 may execute, among information displayed in the display surface, for example, a processing of scrolling a screen displayed in the display surface based on the distance and the direction which are detected by the drag detection section 113 as the second processing.

The control section 110 may include a contact end detection section 114 or the like. The contact end detection section 114 detects that the operation tool 210 ends touching the contact surface 102a.

1-8. A Flow of Operations of an Information Processing Apparatus

Figure 8:
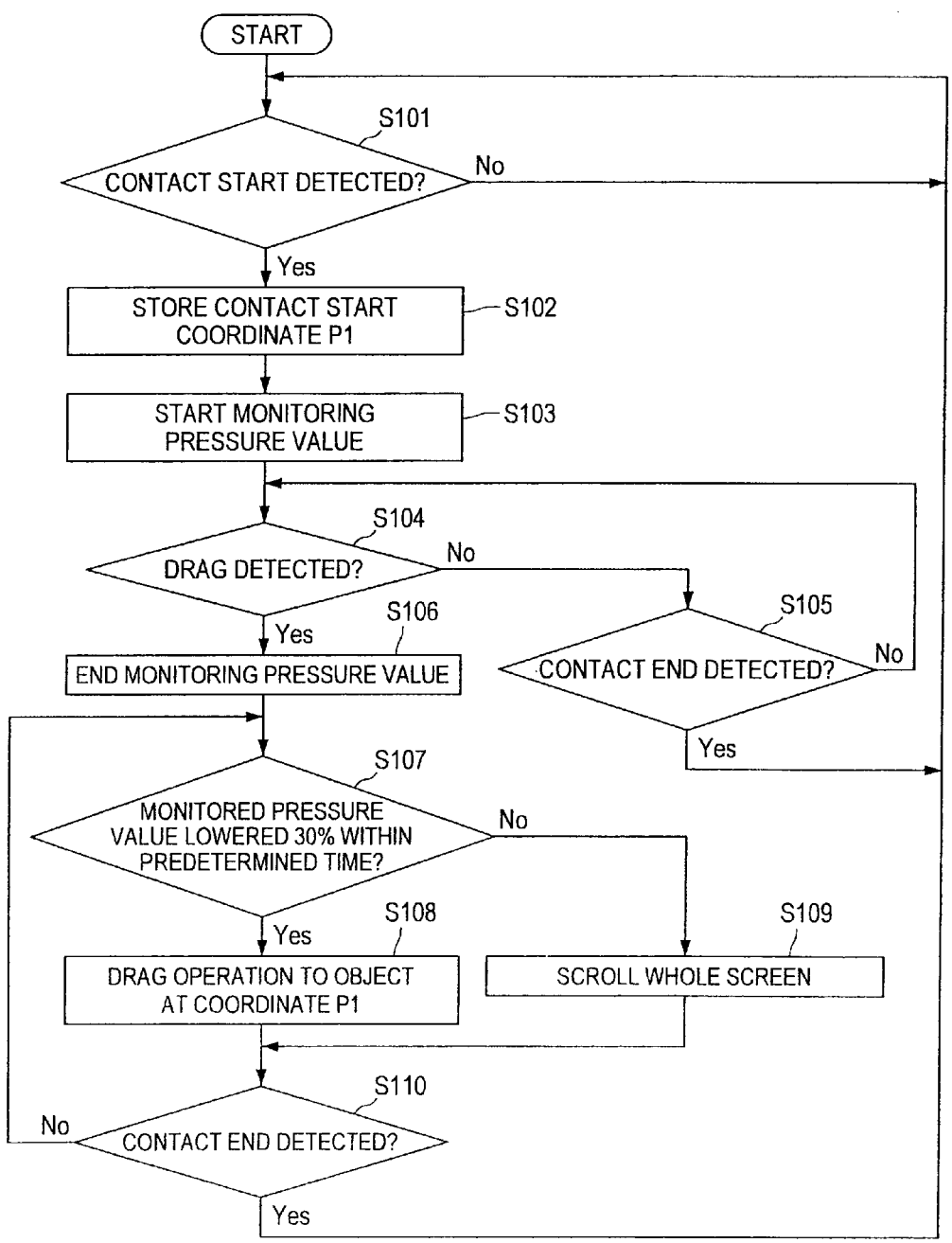
FIG. 8 is a flow chart indicating a flow of operations in the information processing apparatus according to the first embodiment.

FIG. 8 is a flow chart indicating a flow of operations in the information processing apparatus according to the first embodiment of the present invention. The flow of operations in the information processing apparatus according to the first embodiment of the present invention will be explained with reference to FIG. 8.

The contact start detection section 111 of the information processing apparatus 100 checks whether the operation tool 210 such as a finger of the user has contacted the touch panel 102 (step S101). When the contact start detection section 111 determines that the operation tool 210 has contacted the touch panel 102 (Yes in step S101), the first processing section 116 stores a position on the contact surface 102a where the operation tool 210 contacted as coordinate P1 (a contact position) (step S102). The pressure value monitor section 112 starts to monitor the pressure value detected by the pressure value detection section 130 (step S103).

The drag detection section 113 determines whether a drag is detected (step S104). When the drag detection section 113 determines that a drag is not detected (No in step S104), the contact end detection section 114 determines whether the operation tool 210 ends contacting the touch panel 102 (step S105). When the contact end detection section 114 determines that the contacting ends (Yes in step S105), the control section 110 executes an arbitrary processing or the like to be executed when the touch panel 102 is tapped, and returns to step S101. When the contact end detection section 114 determines that the contacting does not end (No in step S105), the control section 110 returns to step S104.

When the drag detection section 113 determines that the drag is detected (Yes in step S104), the pressure value monitor section 112 ends monitoring the pressure value detected by the pressure value detection section 130 (step S106). The process control section 115 determines whether the pressure value monitored by the pressure value monitor section 112 has decreased by 30 percent within the predetermined period of time (step S107). When the process control section 115 determines that the pressure value has not decreased by 30 percent within the predetermined period of time (No in step S107), the second processing section 117 scrolls over the entire screen displayed in the display section 150, as an example of the second processing, and proceeds to step S110.

When the process control section 115 determined that the pressure value has decreased by 30 percent within the predetermined period of time (Yes in step S107), the first processing section 116 moves an object on the coordinate P1, among information displayed on the display section 150, as an example of the first processing, and proceeds to step S110.

The contact end detection section 114 determines whether the operation tool 210 ends contacting the touch panel 102 (step S110). When determined that the contacting ends (Yes in step S110), returns to step S101. When determined that the contacting does not end (No in step S110), returns to step S107.

2. Modification of the First Embodiment of the Present Invention

It should be understood by those skilled in the art that various modifications, combinations, sub-combinations and alterations may occur depending on design requirements and other factors insofar as they are within the scope of the appended claims or the equivalents thereof.

For example, the above embodiment has been described a case where the first processing which is executed by the first processing section 116 is a processing to move an object, and the second processing which is executed by the second processing section 117 is a processing to scroll a screen, however, the present invention is not limited to this example.

2-1. A First Modification

FIG. 9 is an explanatory view illustrating operations in the information processing apparatus according to a first modification of the present embodiment of the present invention. The operations in the information processing apparatus according to a first modification of the present embodiment of the present invention will be explained with reference to FIG. 9.

As shown in FIG. 9, the first processing section 116 may execute, as the first processing, a processing to select information existing in the area specified based on a contact start position Q1, and a position Q4 which is moved from the contact start position Q1 based on a direction and a distance that are detected by the drag detection section 113, among information displayed on a display surface 101d in a web browser or the like being started up. The area is shown as a selected area 222 in a display surface 101e. In FIG. 9 shows an example where the selected area 222 is text data, however, it is not limited to be text data.

On a display surface 101f, it is shown a screen to be displayed after the second processing section 117 scrolled based on the direction and the distance which are detected by the drag detection section 113.

2-2. A Second Modification

FIG. 10 is an explanatory view illustrating operations in the information processing apparatus according to a second modification of the present embodiment of the present invention. The operations in the information processing apparatus according to a second modification of the present embodiment of the present invention will be explained with reference to FIG. 10.

As shown in FIG. 10, when the information processing apparatus 100 starts up an application for reproducing a video image, the first processing section 116 may execute a processing to display a window 223 at the contact start position of a display surface 101g as the first processing. A button for specifying a command by the operation tool 210 is arranged inside the window 223. The first processing 116 may further execute a processing following the command specified by the selected button when determined that the operation tool 210 has selected the button arranged in the window 223.

The first processing section 116 may reproduce, for example, a video image at an increasing speed when a button for fast-forwarding is displayed at a position R4 moved from a contact start position R1 based on a direction and a distance that are detected by the drag detection section 113. A case is shown where the button for fast-forwarding is displayed at the position R4 in the display surface 101h. Moreover, the first processing section 116 may reproduce, for example, a video image at an increasing speed when determined that the operation tool 210 has contacted with a position on the touch panel 102 corresponding to the position where the button for fast-forwarding is displayed.

The second processing section 117 may fast-forward or fast-rewind a video image displayed on the display surface 101g based on the direction and the distance that are detected by the drag detection section 113. The second processing section 117 determines, for example, a rightward vector component given based on the direction and the distance that are detected by the drag detection section 113, and fast-forwards the video image displayed on the display surface 101g in accordance with the rightward vector component. Moreover, the second processing section 117 determines, for example, a leftward vector component given based on the direction and the distance that are detected by the drag detection section 113, and fast-rewinds the video image displayed on the display surface 101g in accordance with the leftward vector component.

An example is shown where the second processing section 117 fast-forwards a video image displayed in accordance with a rightward component on a display surface 101i. Here, as an example of the second processing, it is shown a processing for fast-forwarding or fast-rewinding the video image in accordance with the direction and the distance of dragging, however, other gesture operation may be executed as the second processing.

2-3. A Third Modification

FIG. 11 is an explanatory view illustrating operations in the information processing apparatus according to a third modification of the present embodiment of the present invention. The operations in the information processing apparatus according to a third modification of the present embodiment of the present invention will be explained with reference to FIG. 11.

As shown in FIG. 11, the information processing apparatus 100 starts up a paint tool or the like, a contact start position S1 is to be a start point, and a position S4 moved from the contact start position S1 based on the direction and the distance that are detected by the drag detection section 113 is to be a end point. In this case, the first processing section 116 may execute a processing to draw a line 224 at a position in the display surface 101j corresponding to from the start point to the end point, as the first processing. A screen to be displayed after the second processing 117 draws the line 224 based on the direction and the distance that are detected by the drag detection section 113 is shown on a display surface 101k.

A screen to be displayed after the second processing 117 scrolls based on the direction and the distance that are detected by the drag detection section 113 is shown on a display surface 101l.

3. Summary

According to the present embodiment and its modifications, the information processing apparatus can distinguish a processing to be executed (for example, a screen scrolling and an object selection) based on a difference in dragging operations by a user without forcing the user to learn a new operation. Moreover, the processing executed by the information processing apparatus is not limited to a screen scrolling or an object selection, but may be a processing executed by dragging operations. The information processing apparatus according to the present embodiment and its modifications starts up an application such as the Media Player (registered trademark), a paint tool, a web browser, a map viewer or the like, and can be applied to devices in general which accept commands from a user by dragging operations.

The present application contains subject matter related to that disclosed in Japanese Priority Patent Application JP 2009-202957 filed in the Japan Patent Office on Sep. 2, 2009, the entire content of which is hereby incorporated by reference.

What is claimed is:

1. An information processing apparatus comprising:
   a display section that has a display surface and is capable of displaying information on the display surface;
   a touch panel that has a contact surface and is capable of detecting a position in the display surface where an operation tool has contacted with as a contact position;
   a pressure value detection section that detects a pressure value which is a size of a pressure applied to the contact surface by a contact between the operation tool and the contact surface;
   a pressure value monitor section that monitors the pressure value detected by the pressure value detection section in conjunction with an elapsed time;
   a drag detection section that detects a drag that is an operation in which the operation tool moves while contacting with the contact surface;
   a process control section that specifies a first processing or a second processing as a processing subject to be executed according to an amount of change of the pressure value, within a predetermined period of time, monitored by the pressure value monitor section when the drag detection section detects the drag;

a first processing section that executes the first processing when the process control section specifies the first processing as a processing subject to be executed; and a second processing section that executes the second processing when the process control section specifies the second processing as a processing subject to be executed, wherein when the monitored pressure value does not reduce by a threshold amount during the predetermined period of time, the process control section specifies the second processing as the processing subject to be executed and initiates, as the second processing, a scroll operation to scroll the information displayed on the display surface in correspondence with the detected drag, wherein when the monitored pressure value reduces by at least the threshold amount during the predetermined period of time, the process control section specifies the first processing as the processing subject to be executed, and initiates, as the first processing, a selection of a displayed object located in correspondence with the contact position and a moving of the displayed object relative to other portions of the displayed information in correspondence with the detected drag, wherein the detected drag is initiated from the contact position, and the detected drag is a same gesture which initiates the execution of either the first processing or the second processing based on the monitored pressure in conjunction with the elapsed time of the operation tool upon the contact surface at the contact position, wherein the drag detection section further detects a time when the drag has been started as a drag start time, and wherein the process control section uses a ratio of the pressure value at the drag start time to the pressure value at a time the predetermine period of time earlier than the drag start time detected by the drag detection section as the amount of change within the predetermined period of time.

2. The information processing apparatus according to claim 1,
wherein the threshold amount is a 30% decrease of pressure value during the predetermined period of time.

3. The information processing apparatus according to claim 1,
wherein, when the drag detection section has detected the drag, the pressure value monitor section stops monitoring the pressure value detected by the pressure value detection section.

4. The information processing apparatus according to claim 1,
wherein the process control section specifies the first processing as a processing subject to be executed when a condition that its ratio is equal to or less than a predetermined value is met, and specifies the second processing as a processing subject to be executed when the condition is not met.

5. The information processing apparatus according to claim 1 further comprising a contact start detection section that detects a position where the operation tool starts contacting with the contact surface as a contact start position,
wherein the first processing section executes a processing using the contact start position detected by the contact start detection section as the first processing.

6. The information processing apparatus according to claim 5,
wherein the first processing section executes a processing of selecting information existing in an area to be specified based on the contact start position, and a position which is moved from the contact start position based on the direction and the distance that are detected by the drag detection section, among information displayed on the display surface, as the first processing.

7. The information processing apparatus according to claim 5,
wherein the second processing section fast-forwards or fast-rewinds a video image to be displayed in the display surface based on the direction and the distance that are detected by the drag detection section.

8. The information processing apparatus according to claim 5,
wherein when a contact start position is to be a start point, and when a position moved from the contact start position based on the direction and the distance that are detected by the drag detection section is to be an end point, the first processing section executes a processing to draw a line at a position in the display surface corresponding to from the start point to the end point as the first processing.

9. The information processing apparatus according to claim 5,
wherein the drag detection section further detects a distance and a direction which the operation tool moves while contacting the contact surface by the drag, and
wherein the first processing section executes a processing to move an object displayed at a position corresponding to the contact start position detected by the contact start detection section, among information displayed on the display surface, based on the direction and the distance that are detected by the drag detection section as the first processing.

10. The information processing apparatus according to claim 9,
wherein the second processing section executes a processing of scrolling a screen displayed in the display surface, among information displayed in the display surface, based on the distance and the direction which are detected by the drag detection section as the second processing.

11. The information processing apparatus according to claim 5,
wherein the first processing section executes a processing of displaying a window, in which a button for specifying a command by the operation tool is arranged, at the contact start position of the display surface as the first processing.

12. The information processing apparatus according to claim 11,
wherein the first processing section executes a processing following the command specified by the selected button when determined that the operation tool has selected the button arranged in the window.

13. An information processing method comprising the steps of:
detecting a pressure value which is a size of a pressure applied to a contact surface by a contact between an operation tool and the contact surface by a pressure value detection section of an information processing apparatus which includes a display section that has a display surface and is capable of displaying information on the display surface, a touch panel that has the contact surface and is capable of detecting a position in the display surface where the operation tool has contacted with as a contact position, the pressure value detection section, a pressure value monitor section that monitors the pressure value detected by the pressure value detection section in conjunction with an elapsed time, a drag detection section that detects a drag that is an operation in which the operation tool moves while contacting with the contact surface, a process control section, a first processing section, and a second processing section;

specifying, by the process control section, a first processing or a second processing as a processing subject to be executed in accordance with an amount of change of the pressure value, within a predetermined period of time, detected by the pressure value detection section;

executing, by the first processing section, the first processing when the process control section specifies the first processing as a processing subject to be executed; and executing, by the second processing section, the second processing when the process control section specifies the second processing as a processing subject to be executed, wherein when the monitored pressure value does not reduce by a threshold amount during the predetermined period of time, the second processing is specified by the process control section as the processing subject to be executed and a scroll operation is initiated as the second processing to scroll the information displayed on the display surface in correspondence with the detected drag, wherein when the monitored pressure value reduces by at least the threshold amount during the predetermined period of time, the first processing is specified by the process control section as the processing subject to be executed and, as the first processing, a selection is initiated of a displayed object located in correspondence with the contact position and the displayed object is moved relative to other portions of the displayed information in correspondence with the detected drag, and wherein the detected drag is initiated from the contact position, and the detected drag is a same gesture which initiates the execution of either the first processing or the second processing based on the monitored pressure in conjunction with the elapsed time of the operation tool upon the contact surface at the contact position, wherein the drag detection section further detects a time when the drag has been started as a drag start time, and wherein the process control section uses a ratio of the pressure value at the drag start time to the pressure value at a time the predetermine period of time earlier than the drag start time detected by the drag detection section as the amount of change within the predetermined period of time.

14. A program stored on a non-transitory computer readable medium for causing a computer to function as an information processing apparatus including:

causing a display section that has a display surface to display information on the display surface;

causing a touch panel that has a contact surface to detect a position in the display surface where an operation tool has contacted with as a contact position;

causing a pressure value detection section to detect a pressure value which is a size of a pressure applied to the contact surface by a contact between the operation tool and the contact surface;

causing a pressure value monitor section to monitor the pressure value detected by the pressure value detection section in conjunction with an elapsed time;

causing a drag detection section to detect a drag that is an operation in which the operation tool moves while contacting with the contact surface;

causing a process control section to specify a first processing or a second processing as a processing subject to be executed in accordance with an amount of change of the pressure value, within a predetermined period of time, detected by the pressure value detection section;

causing a first processing section to execute the first processing when the process control section specifies the first processing to be a processing subject to be executed; and causing a second processing section to execute the second processing when the process control section specifies the second processing to be a processing subject to be executed, wherein when the monitored pressure value does not reduce by a threshold amount during the predetermined period of time, the second processing is specified by the process control section as the processing subject to be executed and a scroll operation is initiated as the second processing to scroll the information displayed on the display surface in correspondence with the detected drag, wherein when the monitored pressure value reduces by at least the threshold amount during the predetermined period of time, the first processing is specified by the process control section as the processing subject to be executed and, as the first processing, a selection is initiated of a displayed object located in correspondence with the contact position and the displayed object is moved relative to other portions of the displayed information in correspondence with the detected drag, and wherein the detected drag is initiated from the contact position, and the detected drag is a same gesture which initiates the execution of either the first processing or the second processing based on the monitored pressure in conjunction with the elapsed time of the operation tool upon the contact surface at the contact position, wherein the drag detection section further detects a time when the drag has been started as a drag start time, and wherein the process control section uses a ratio of the pressure value at the drag start time to the pressure value at a time the predetermine period of time earlier than the drag start time detected by the drag detection section as the amount of change within the predetermined period of time.

* * * * *